United States Patent
Maloum et al.

(10) Patent No.: US 9,621,091 B2
(45) Date of Patent: Apr. 11, 2017

(54) METHOD AND SYSTEM FOR CONTROLLING AN AUTOMOTIVE VEHICLE THREE-PHASE ELECTRIC MACHINE SUPPLIED VIA CHOPPED VOLTAGES

(71) Applicant: RENAULT s.a.s., Boulogne Billancourt (FR)

(72) Inventors: Abdelmalek Maloum, Chevilly la Rue (FR); Edouard Negre, Montigny le Bretonneux (FR)

(73) Assignee: RENAULT s.a.s., Boulogne Billancourt (FR)

( * ) Notice: Subject to any disclaimer, the term of this patent is extended or adjusted under 35 U.S.C. 154(b) by 0 days.

(21) Appl. No.: 15/026,402

(22) PCT Filed: Nov. 6, 2014

(86) PCT No.: PCT/FR2014/052834
§ 371 (c)(1),
(2) Date: Mar. 31, 2016

(87) PCT Pub. No.: WO2015/071576
PCT Pub. Date: May 21, 2015

(65) Prior Publication Data
US 2016/0248358 A1 Aug. 25, 2016

(30) Foreign Application Priority Data
Nov. 15, 2013 (FR) ...................................... 13 61194

(51) Int. Cl.
*H02P 21/05* (2006.01)
*H02P 23/04* (2006.01)
*B60L 11/18* (2006.01)

(52) U.S. Cl.
CPC .............. *H02P 21/05* (2013.01); *B60L 11/18* (2013.01); *H02P 23/04* (2013.01)

(58) Field of Classification Search
CPC ........................................................ H02P 21/05
(Continued)

(56) References Cited

U.S. PATENT DOCUMENTS

| 6,404,158 B1 * | 6/2002 | Boisvert | ................ B60J 7/0573 |
| | | | 318/466 |
| 2008/0167779 A1 | 7/2008 | Suzuki | |

(Continued)

FOREIGN PATENT DOCUMENTS

| EP | 1 906 523 A1 | 4/2008 |
| EP | 1 944 861 A2 | 7/2008 |

(Continued)

OTHER PUBLICATIONS

International Search Report issued Apr. 22, 2015, in PCT/FR2014/052834 filed Nov. 6, 2014.

(Continued)

*Primary Examiner* — David S Luo
(74) *Attorney, Agent, or Firm* — Oblon, McClelland, Maier & Neustadt, L.L.P.

(57) ABSTRACT

A system for controlling an automotive vehicle three-phase electric machine supplied via chopped voltages, including: a mechanism determining settings of current of phases of the electric machine as a function of a torque request from a driver; a regulating mechanism to determine voltages of each phase as a function of corresponding settings of current; a mechanism correcting torque oscillations, which can determine powers of each phase, to determine whether speed of rotation of the magnetic field exceeds a threshold value, to carry out a bandpass filtering of the powers, and to determine attenuation currents relating to each phase as a (Continued)

Figure 1:
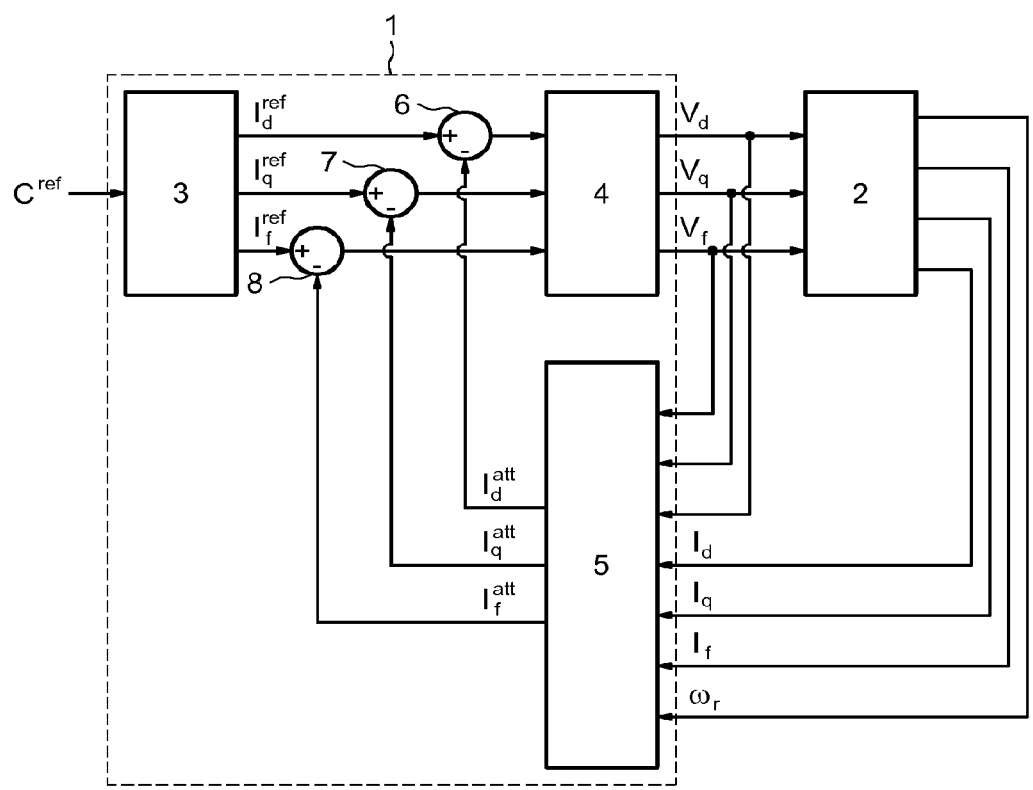

function of the post-filtering powers; subtractors configured to subtract the attenuation currents relating to each phase from the settings of current of the corresponding phases, destined for the regulating mechanism.

8 Claims, 1 Drawing Sheet

(58) Field of Classification Search
USPC .......................................... 318/139, 34, 558
See application file for complete search history.

(56) References Cited

U.S. PATENT DOCUMENTS

| | | |
|---|---|---|
| 2009/0071735 A1 | 3/2009 | Kaneko et al. |
| 2010/0060226 A1 | 3/2010 | Ide |
| 2012/0306411 A1 | 12/2012 | Tadano |
| 2014/0015460 A1 | 1/2014 | Nguyen |

FOREIGN PATENT DOCUMENTS

| | | |
|---|---|---|
| EP | 2 154 779 A2 | 2/2010 |
| FR | 2 973 607 A1 | 10/2012 |

OTHER PUBLICATIONS

French Search Report issued Sep. 26, 2014, in French Application 1361194 filed Nov. 15, 2013.

* cited by examiner

METHOD AND SYSTEM FOR CONTROLLING AN AUTOMOTIVE VEHICLE THREE-PHASE ELECTRIC MACHINE SUPPLIED VIA CHOPPED VOLTAGES

The technical field of the invention is the control of an electric machine for a motor vehicle, and more particularly the control of the torque oscillations of such a machine.

In the context of the development of electric vehicles, the torques supplied by the electric motor has to be controlled. Since the torque of a machine is directly linked to the currents circulating therein, it is therefore necessary to be able to accurately control these currents. The electric motor to be controlled can notably be a wound rotor three-phase synchronous machine.

The currents in the three phases of the stator are sinusoidal and each phase-shifted by $2\pi/3$ rad. These currents create a rotating magnetic field in the machine. The rotor is passed through by a DC current which creates a magnetic field which makes it equivalent to a magnet. To produce the mechanical torque, the stator magnetic field is driven in quadruple, that is to say with a constant controlled phase shift of 90° to the rotor field. Thus, the frequency of the field of the rotor is equal to the frequency of the stator currents, hence the name "synchronous". It is the amplitudes of the stator currents and the value of the rotor current which create the torque necessary to the rotation of the machine. To control these currents, it will therefore be necessary to apply, between the phases of the stator, sinusoidal voltages, each being also phase-shifted by $2\pi/3$ rad and apply a constant voltage to the rotor.

Moreover, the Park transform is used to project the currents and voltages of the stator into a space where the sinusoidal signals become constants. The Park reference frame corresponds to a reference frame linked to the rotating field therefore linked to the rotor in the case of the synchronous machine. The use of the Park transform makes it possible to have to regulate the constants, which is much easier to perform than regulating the sinusoidal signals.

The issue is therefore to regulate constant currents by controlling constant voltages. By performing the inverse transform, it is possible to obtain the reference frame of the stator of the machine and therefore to know accurately the voltages to be applied to each phase of the electric machine.

To regulate the currents in the machine, a corrector is necessary, because it is known that a three-phase machine powered with chopped voltages generates torque oscillations at certain frequencies corresponding to harmonics of the electrical frequency (frequency of rotation of the rotor of the machine).

In the Park space, the system to be controlled is as follows:

$$V_d = R_s I_d + L_d \dot{I}_d + M_f \dot{I}_f - \omega_r L_q I_q$$

$$V_q = R_s I_q + L_q \dot{I}_q + \omega_r (L_d I_d + M_f I_f)$$

$$V_f = R_f I_f + L_f \dot{I}_f + \alpha M_f \dot{I}_d \qquad \text{(Eq. 1)}$$

with:
$V_d$, $V_q$ and $V_f$: respectively the direct voltage, the root mean square voltage and the rotor voltage (in volts),
$I_d$, $I_q$ and $I_f$: the currents circulating in the machine on the three axes of the Park plane (in amperes),
$\dot{I}_d$, $\dot{I}_q$ and $\dot{I}_f$: the derivatives of the respective currents $I_d$, $I_q$ and $I_f$, $R_s$ and $R_f$: the resistances of the stator and of the rotor of the machine (in ohms),
$L_d$, $L_q$ and $L_f$: the inductances on each axis of the machine (in henrys),
$M_f$: the mutual inductance between the stator and the rotor (in henrys),
$\alpha$: a constant term derived from the Park transform (no unit),
$\omega_r$: the speed of rotation of the magnetic field of the machine (in rad/s).

It should be noted that, with regard to a synchronous machine, the speed of rotation $\omega_r$ of the magnetic field of the machine is equal to the speed of rotation of the rotor multiplied by the number of pairs of poles of the machine.

The voltages $V_d$ and $V_q$ are created with an inverter, the voltage $V_f$ is created with a chopper, these two systems being powered by a battery. A chopper cuts continuous voltages to produce continuous voltages of different amplitude with a high efficiency. When an inverter and a chopper are employed, the constraints to be observed are then as follows:

$$\sqrt{V_d^2 + V_q^2} \leq \frac{V_{bat}}{3} \qquad \text{(Eq. 2)}$$

and $$-V_{bat} \leq V_f \leq V_{bat} \qquad \text{(Eq. 3)}$$

with $V_{bat}$: the voltage of the battery which powers the inverter and the chopper.

However, such a system exhibits torque oscillations which can result in a divergence of the current regulator.

From the prior art, the following documents are known.

The patent application FR2973607 aims to reduce the torque oscillations at the source. However, the power is calculated in terms of battery power, which generates power losses. Furthermore, such a calculation requires an additional current sensor to measure the DC current. Moreover, the new current setpoints are calculated from the new torque setpoint.

In the document EP 1906523, the torque oscillations are eliminated by applying a voltage $V_f$ at the terminals of the field system. No centralized or decentralized power-level processing is described.

The document EP 1944861 describes no power-level processing. Nevertheless, a decentralization of the processing of the compensation is described. In other words, the direct axis d and the root mean square axis q are processed separately. For this, a real-time calculation of a phase shift between the electrical angle of the current and the electrical angle expected to compensate the torque oscillations is described.

A form of regulation is therefore described that anticipates the current measurements in order to produce voltages to compensate the torque oscillation phenomenon.

It is also known practice to apply a correction called: "anti-curative surges", in which the measurement of speed of the electric machine has applied to it a filtering calculated on the basis of a dynamic model of the kinematic chain. The signal thus processed represents a torque setpoint phase-shifted in relation to the torque oscillations. This is injected into the main torque setpoint and produces an attenuation of the oscillations.

However, these solutions do not make it possible to reduce the oscillations "at the source", that is to say at the electric power level, and over the entire range of rotation speeds.

There is therefore a need for a method for controlling an electric motor that makes it possible to reduce the torque harmonics linked to the topology of the machine.

One subject of the invention is a method for controlling a three-phase electric machine of a motor vehicle powered by chopped voltages and comprising a step of determination of current setpoints for each phase of the electric machine as a function of a torque request from the driver, and a step of determination of the voltages of each phase of the electric machine as a function of the current setpoints for each phase. Chopped voltages should be understood to be voltages from a chopper making it possible to modify the amplitude of an input voltage by subdivision. The method comprises the following steps during which:

the powers of each phase of the electric machine are determined, expressed in the Park reference frame, a determination is made as to whether a measurement of the speed of rotation of the magnetic field in the electric machine exceeds a threshold value, and, if it does, a bandpass filtering of the powers of each phase of the electric machine is performed, each power after filtering is multiplied by gains that can be calibrated to obtain attenuation currents relative to each phase, final current setpoints are determined by subtracting the attenuation currents relative to each phase from the current setpoints of the corresponding phases, and power supply voltage setpoints for the phases of the electric machine are determined as a function of the final current setpoints.

The bandpass filtering can be performed for a low cut-off frequency lower than the frequency of rotation of the magnetic field at which the oscillations are observed and a high cut-off frequency greater than the frequency of rotation of the magnetic field at which the oscillations are observed.

The electric machine can be synchronous or asynchronous.

The rotation speed threshold of the magnetic field is determined as a function of the speed of rotation of the magnetic field at which torque oscillations are observed.

Another subject of the invention is a system for controlling a three-phase electric machine of a motor vehicle powered by chopped voltages, comprising a means for determining current setpoints of each phase of the electric machine as a function of a torque request from the driver, and a means for regulating the currents capable of determining voltages of each phase of the electric machine as a function of the current setpoints for each phase. The system comprises a means for correcting the torque oscillations, capable of determining the powers of each phase of the electric machine expressed in the Park reference frame, the correction means being also capable of determining whether a measurement of the speed of rotation of the magnetic field in the electric machine exceeds a threshold value, and of performing a bandpass filtering of the powers of each phase of the electric machine, and for determining attenuation currents relative to each phase as a function of the powers after filtering, and subtractors capable of subtracting the attenuation currents relative to each phase from the current setpoints relative to the corresponding phases in order to obtain final current setpoints, and capable of sending the final current setpoints to the regulation means of the electric machine.

The bandpass filtering can be performed for a low cut-off frequency below the frequency of rotation of the magnetic field at which the oscillations are observed and a high cut-off frequency above the frequency of rotation of the magnetic field at which the oscillations are observed.

The rotation speed threshold of the magnetic field is determined as a function of the speed of rotation of the magnetic field at which torque oscillations are observed.

The electric machine can be synchronous or asynchronous.

Figure 2:
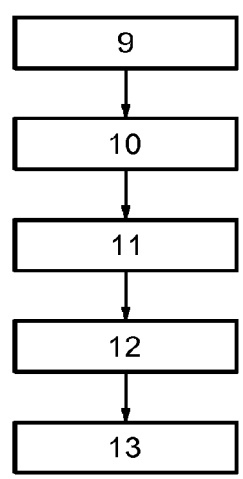

Other aims, features and advantages will become apparent on reading the following description given purely as a nonlimiting example and with reference to the attached drawings in which:

FIG. 1 illustrates the main elements of a control system according to the invention, and FIG. 2 illustrates the main steps of a control method according to the invention.

The control system 1, illustrated by FIG. 1, of an electric machine 2 comprises a means 3 for determining current setpoints relative to each of the phases of the electric machine in the Park reference frame (d, q, f) as a function of the torque request from the driver $C^{ref}$.

The control system 1 comprises a means 4 for regulating currents in the phases of the electric machine. The regulation means 4 determines power supply voltages Vd, Vq, Vf for each of the phases of the electric machine as a function of the current setpoints received as input.

The control system 1 also comprises a means 5 for correcting torque oscillations receiving, as input, the power supply voltages $V_d$, $V_q$, $V_f$ of each of the phases, measurements of the currents of each phase $I_d$, $I_q$, $I_f$ and a measurement of the speed of rotation $\omega_r$ of the magnetic field. The means 5 for correcting the torque oscillations sends, as output, attenuation currents $I_d^{att}$, $I_q^{att}$, $I_f^{att}$ for the torque oscillations relative to each phase.

A first subtractor 6 performs the subtraction between the current setpoint of the phase d and the corresponding attenuation current. It sends as output a final current setpoint relative to the phase d.

A second subtractor 7 and a third subtractor 8 perform similar subtractions on the values relative respectively to the phase q and to the phase f.

Thus, when the system is started up, the current setpoint of each phase is transmitted without modification to the current regulation means 4. However, as soon as measurements of the currents of each phase $I_d$, $I_q$, $I_f$ and a measurement of the speed of rotation $\omega_r$ of the magnetic field are available, the current setpoints transmitted to the current regulation means 4 are the final current setpoints, then making it possible to reduce, even eliminate, the torque oscillations.

The method for controlling an electric machine makes it possible to provide a dynamic correction of the current setpoints so as to reduce the amplitude of the torque oscillations.

In FIG. 2, it can be seen that the method begins with a step 9 of calculation of the powers of each phase, by applying the following equations:

$$\begin{cases} P_d = V_d I_d - R_s I_d^2 \\ P_q = V_q I_q - R_s I_q^2 \\ P_f = V_f I_f - R_f I_f^2 \end{cases} \quad \text{(Eq. 3)}$$

with $P_d$ the power of the phase d, $P_q$ the power of the phase q, and $P_f$ the power of the phase f.

During a second step 10, a determination is made as to whether the speed of rotation $\omega_r$ of the magnetic field exceeds a threshold value. The threshold value is determined according to prior tests, during which torque oscillations are observed. The threshold value is then set at a value equal to the speed of rotation of the magnetic field at which the torque oscillations have been observed. It will be recalled that speed of rotation and frequency of rotation are directly linked. If such is the case, a bandpass filtering of each power signal is applied in order to extract only the relevant frequencies. The bandpass filter is configured with a low cut-off frequency below the frequency of rotation of the magnetic field at which the oscillations are observed and a high cut-off frequency above the frequency of rotation of the magnetic field at which the oscillations are observed.

There are then obtained $P_d^{filt}$, the power of the phase d after filtering, $P_q^{filt}$, the power of the phase q after filtering, and $P_f^{filt}$, the power of the phase f after filtering.

During a third step 11, each power after filtering is multiplied by gains that can be calibrated to obtain the attenuation currents relative to each phase. The following equations make it possible to determine these currents:

$$\begin{cases} I_d^{att} = \alpha_d P_d^{filt} \\ I_q^{att} = \alpha_q P_q^{filt} \\ I_f^{att} = \alpha_f P_f^{filt} \end{cases} \quad \text{(Eq. 4)}$$

with
$I_d^{att}$: attenuation current relative to the phase d
$I_q^{att}$: attenuation current relative to the phase q
$I_f^{att}$: attenuation current relative to the rotor f
$\alpha_d$: calibratable gain relative to the phase d
$\alpha_q$: calibratable gain relative to the phase q
$\alpha_f$: calibratable gain relative to the rotor f During a fourth step 12, the attenuation currents relative to each phase are subtracted from the current setpoints relative to the corresponding phases and determined as a function of the torque request from the driver. The following equations make it possible to determine the final current setpoints deriving from the subtraction:

$$\begin{cases} I_d^{fin} = I_d^{ref} - I_d^{att} \\ I_q^{fin} = I_q^{ref} - I_q^{att} \\ I_f^{fin} = I_f^{ref} - I_f^{att} \end{cases} \quad \text{(Eq. 5)}$$

with
$I_d^{fin}$: final current setpoint relative to the phase d
$I_q^{fin}$: final current setpoint relative to the phase q
$I_f^{fin}$: final current setpoint relative to the rotor f
$I_d^{ref}$: current setpoint relative to the phase d
$I_q^{ref}$: current setpoint relative to the phase q
$I_f^{ref}$: current setpoint relative to the rotor f The final current setpoints are then sent to the regulation means (4) of the electric machine during a fifth step 13.

It should be noted that the system and method for controlling the electric machine making it possible to reduce the torque oscillations described above can be applied to all synchronous or asynchronous electric machines.

The invention claimed is:

1. A method for controlling a three-phase electric machine of a motor vehicle powered by chopped voltages and comprising:

determining current setpoints for each phase of the electric machine as a function of a torque request from a driver;
determining voltages of each phase of the electric machine as a function of the current setpoints for each phase;
determining powers of each phase of the electric machine, expressed in the Park reference frame;
determining whether a measurement of speed of rotation of the magnetic field in the electric machine exceeds a threshold value, and, if it does, performing a bandpass filtering of the powers of each phase of the electric machine;
multiplying each power after filtering by gains that can be calibrated to obtain attenuation currents relative to each phase;
determining final current setpoints by subtracting the attenuation currents relative to each phase from the current setpoints of the corresponding phases; and
determining power supply voltage setpoints for the phases of the electric machine as a function of the final current setpoints.

2. The method as claimed in claim 1, wherein the bandpass filtering is performed for a low cut-off frequency below frequency of rotation of the magnetic field at which oscillations are observed and a high cut-off frequency above frequency of rotation of the magnetic field at which the oscillations are observed.

3. The method as claimed in claim 1, wherein the electric machine is synchronous or asynchronous.

4. The method as claimed in claim 1, wherein the rotation speed threshold of the magnetic field is determined as a function of the speed of rotation of the magnetic field at which torque oscillations are observed.

5. A system for controlling a three-phase electric machine of a motor vehicle powered by chopped voltages, comprising:

a means for determining current setpoints of each phase of the electric machine as a function of a torque request from a driver;
a means for regulating currents capable of determining voltages of each phase of the electric machine as a function of the current setpoints for each phase;
a correction means for correcting torque oscillations, configured to determine powers of each phase of the electric machine expressed in the Park reference frame, the correction means configured to determine whether a measurement of speed of rotation of the magnetic field in the electric machine exceeds a threshold value, and to perform a bandpass filtering of powers of each phase of the electric machine, and to determine attenuation currents relative to each phase as a function of the powers after filtering; and
subtractors configured to subtract attenuation currents relative to each phase from the current setpoints relative to the corresponding phases to obtain final current setpoints, and to send the final current setpoints to the regulation means of the electric machine.

6. The system as claimed in claim 5, wherein the bandpass filtering is performed for a low cut-off frequency below the frequency of rotation of the magnetic field at which the oscillations are observed and a high cut-off frequency above the frequency of rotation of the magnetic field at which the oscillations are observed.

7. The system as claimed in claim 5, wherein the rotation speed threshold of the magnetic field is determined as a function of the speed of rotation of the magnetic field at which torque oscillations are observed.

8. The system as claimed in claim 5, wherein the electric machine is synchronous or asynchronous.

* * * * *